(12) United States Patent
Manuel

(10) Patent No.: US 10,167,039 B1
(45) Date of Patent: Jan. 1, 2019

(54) RIDER SAFETY SYSTEM FOR A MOTORCYCLE

(71) Applicant: Andy Manuel, Fort Mcmurray (CA)

(72) Inventor: Andy Manuel, Fort Mcmurray (CA)

( * ) Notice: Subject to any disclaimer, the term of this patent is extended or adjusted under 35 U.S.C. 154(b) by 0 days.

(21) Appl. No.: 15/446,145

(22) Filed: Mar. 1, 2017

Related U.S. Application Data

(60) Provisional application No. 62/301,696, filed on Mar. 1, 2016.

(51) Int. Cl.
*B62K 21/12* (2006.01)
*B62J 27/00* (2006.01)
*B62J 25/00* (2006.01)
*B62K 21/24* (2006.01)
*B62K 21/26* (2006.01)

(52) U.S. Cl.
CPC .............. *B62K 21/125* (2013.01); *B62J 25/00* (2013.01); *B62J 27/00* (2013.01); *B62K 21/24* (2013.01); *B62K 21/26* (2013.01)

(58) Field of Classification Search
CPC .............................. B62K 21/12; B62K 21/125
See application file for complete search history.

(56) References Cited

U.S. PATENT DOCUMENTS

| | | | |
|---|---|---|---|
| D289,630 S * | 5/1987 | Owens | 74/551.8 |
| 6,467,372 B2 | 10/2002 | Klieber | |
| 6,868,584 B2 | 3/2005 | Trottier | |
| 7,467,478 B1 * | 12/2008 | Williams | B62J 99/00 33/203 |
| 2002/0119868 A1 * | 8/2002 | Chao | A63B 21/0004 482/57 |
| 2003/0006082 A1 | 1/2003 | Popoff | |
| 2008/0315551 A1 | 12/2008 | Battistini | |
| 2010/0269624 A1 | 10/2010 | Price et al. | |
| 2013/0119636 A1 | 5/2013 | Hon | |

* cited by examiner

*Primary Examiner* — Kevin Hurley
(74) *Attorney, Agent, or Firm* — Cramer Patent & Design, PLLC; Aaron R. Cramer

(57) ABSTRACT

A retrofit rider safety kit for a motorcycle includes handlebars with an attachment mounting bracket and a pair of foot pegs. The handlebar and foot pegs are secured near the front of a motorcycle frame. The handlebars are secured to the mounting bracket by a push button release mechanism.

18 Claims, 4 Drawing Sheets

RIDER SAFETY SYSTEM FOR A MOTORCYCLE

RELATED APPLICATIONS

This application claims the benefit of U.S. Provisional Application No. 62/301,696 which was filed Mar. 1, 2016, the entire disclosures of which are incorporated herein by reference.

FIELD OF THE INVENTION

The present invention relates generally to the field of motorcycle safety and more specifically relates to a removable motorcycle passenger safety system.

BACKGROUND OF THE INVENTION

Motorcycles are a common method of transportation due to their mobility, low relative fuel consumption and pleasure to the rider. In some instances, a motorcycle rider may also include a passenger in their travels. There are various devices and ways to carry a passenger on a motorcycle.

The motorcycle passenger may be carried in a sidecar or may sit on the motorcycle behind the rider. Various devices can be found to make the carrying of a passenger on a motorcycle safer. A "sissy bar" may be used to support the back of the passenger when sitting on the motorcycle behind the rider. Also available are various types of handles or bars for the passenger to hold while on the motorcycle as are available auxiliary foot-pegs to support the feet of the passenger.

It is also desirable for a rider to have a passenger, such as a child, sit in front of them. By having a child passenger sit in front of them, the parent can be more comfortable with the safety of the child than if the child was seated behind the rider. Also, by sitting in front, the child can have a more exciting ride to feel a sensation similar to that of the rider/driver. One (1) such limitation with the auxiliary handles, bars, and foot pegs currently found in the art is that they are not configurable to allow a rider to have a passenger in front of the rider/driver. It is also desirable to have the auxiliary handlebars available to be removable for the comfort of the rider when the rider has no passenger. Additionally, it is desirable to provide foot-pegs for the passenger to prevent the passenger from dragging his or her feet and/or placing his or her foot on a hot exhaust pipe. Therefore, a suitable solution is desired.

Various attempts have been made to solve problems found in motorcycle passenger art. Among these are found in: U.S. Pat. No. 8,887,357 to Jimenez, 2003/0196299 to Trottier, D 626,816 to Claxton, U.S. Pat. No. 6,896,279 to Galvagno, U.S. Pat. No. 7,137,640 to Rice et al., and U.S. Pat. No. 3,391,582 to Polly, Jr. These prior art references are representative of motorcycle passenger handles.

None of the above inventions and patents, taken either singly or in combination, is seen to describe the invention as claimed. Thus, a need exists for a reliable a removable motorcycle passenger system and to avoid the above-mentioned problems.

SUMMARY OF THE INVENTION

The principles of the present invention provide for a rider safety system, comprising a handlebar assembly and at least one foot peg assembly. The handlebar assembly comprises a handlebar mount which has a handlebar mount first, second and third side, a post which is secured at a post first end to the handlebar mount second side and extending away from the handlebar mount second side, a quick connect fitting which is secured to the post at a post second end opposite the handlebar mount second side, a first handlebar which has a first handlebar first end and a first handlebar second end and a second handlebar which has a second handlebar first end and a second handlebar second end. The first handlebar first end and the second handlebar first end are secured to the quick connect fitting.

Each foot peg assembly comprises a foot peg mount, having a fixed arm with a fixed arm first end being secured to the foot peg mount, an extendable arm, having an extendable arm first end which is configured to slidably engage a fixed arm second end and a foot peg which is affixed to an extendable arm second end. The handlebar mount and foot peg mount are both configured to be secured to a motorcycle frame.

The handlebar mount may comprise of a first handlebar mount aperture which is disposed within the handlebar mount first side opposite the quick connect fitting and a second handlebar mount aperture which is disposed within the handlebar mount third side and also opposite the quick connect fitting. The first handlebar mount aperture and the second handlebar mount aperture are each capable of receiving a fastener to removably secure the handlebar assembly to the motorcycle frame.

The first handlebar may also comprise a first grip which is removably secured to the first handlebar second end while the second handlebar may likewise comprise a second grip which is also removably secured to the second handlebar second end. The quick connect fitting may further comprise a switch, wherein activation of the switch releases the handle bar assembly from the post.

The first and second handlebars may be secured at an equal and opposite angle to the quick connect fitting. The foot peg mount may comprise of a clamp which is configured to removably attach the foot peg mount to the motorcycle frame. The fixed arm may comprise a plurality of apertures which are configured to receive an adjustable pin lock thus securing the extendable arm within the fixed arm at a desired position. The foot peg may comprise a textured surface. While the foot peg mount may be hingedly secured to the fixed arm.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
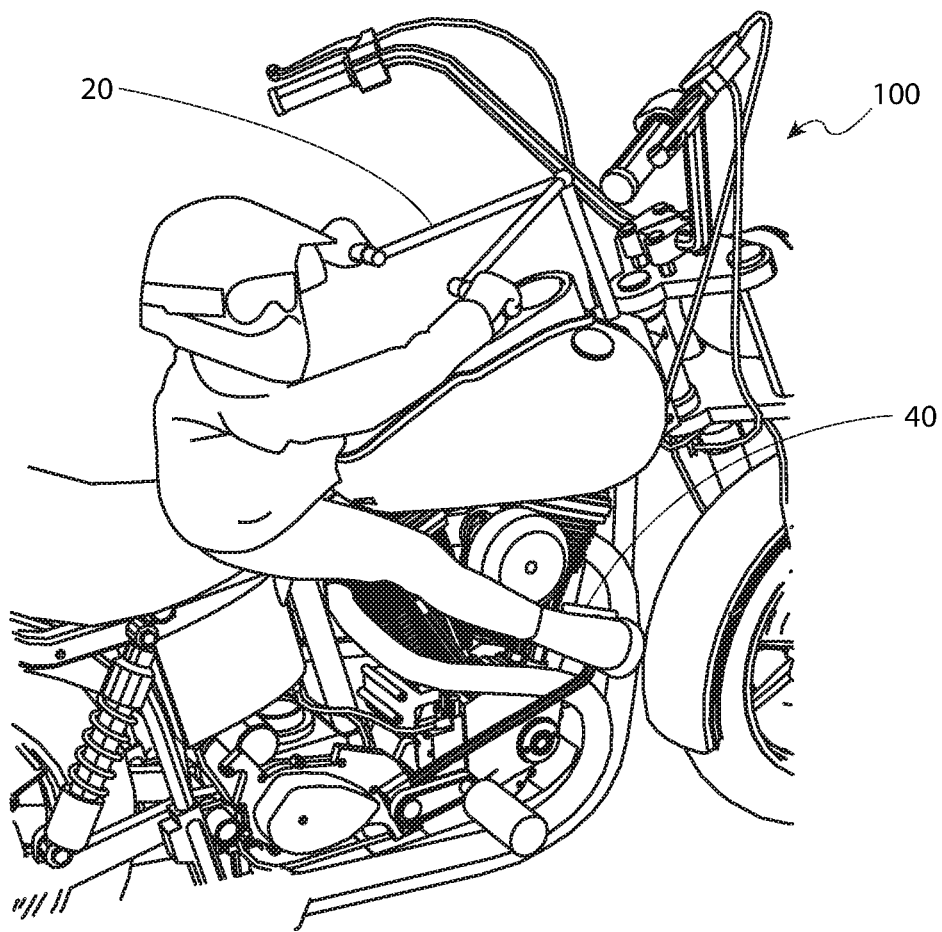
FIG. 1 is perspective view illustrating an environmental view of the rider safety system 10, showing a handlebar assembly 20 and a foot peg assembly 40 removably attached to a motorcycle 100, according to a preferred embodiment of the present invention.

DESCRIPTIVE KEY 10 rider safety system
20 handlebar assembly
21a first handlebar
21b second handlebar
22a first grip
22b second grip
30 quick-connect fastener assembly
30a quick-connect fastener switch
30b quick-connect fastener stem
30c quick-connect fastener receiver
32 post
35a handlebar mount first side
35b handlebar mount second side
35c handlebar mount third side
37a first handlebar mount aperture
37b second handlebar mount aperture
40 foot peg assembly
41 foot peg
42 extension arm
43 fixed arm
44 foot peg assembly apertures
45 foot peg mount
46 foot peg hinge
47 pin-lock
48 foot peg swivel connector
49 foot peg surface
100 motorcycle

DETAILED DESCRIPTION OF THE PREFERRED EMBODIMENT

Figure 2:
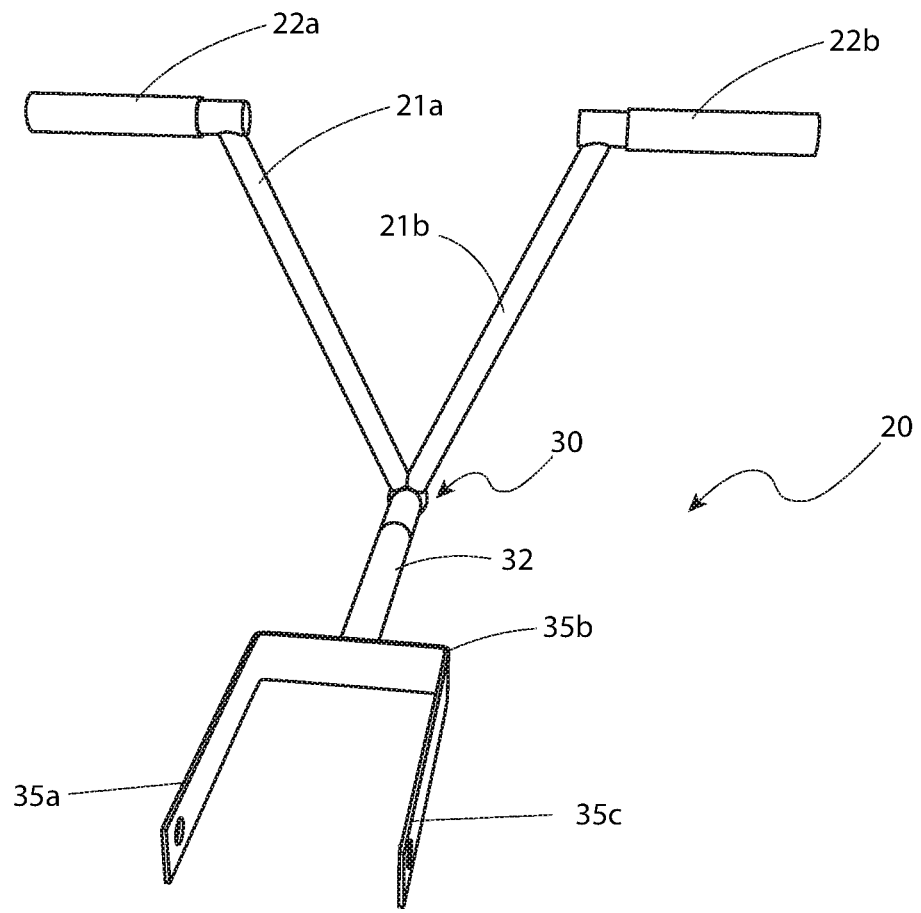
FIG. 2 is a perspective view of a handlebar assembly 20, according to the preferred embodiment of the present invention.
Figure 3:
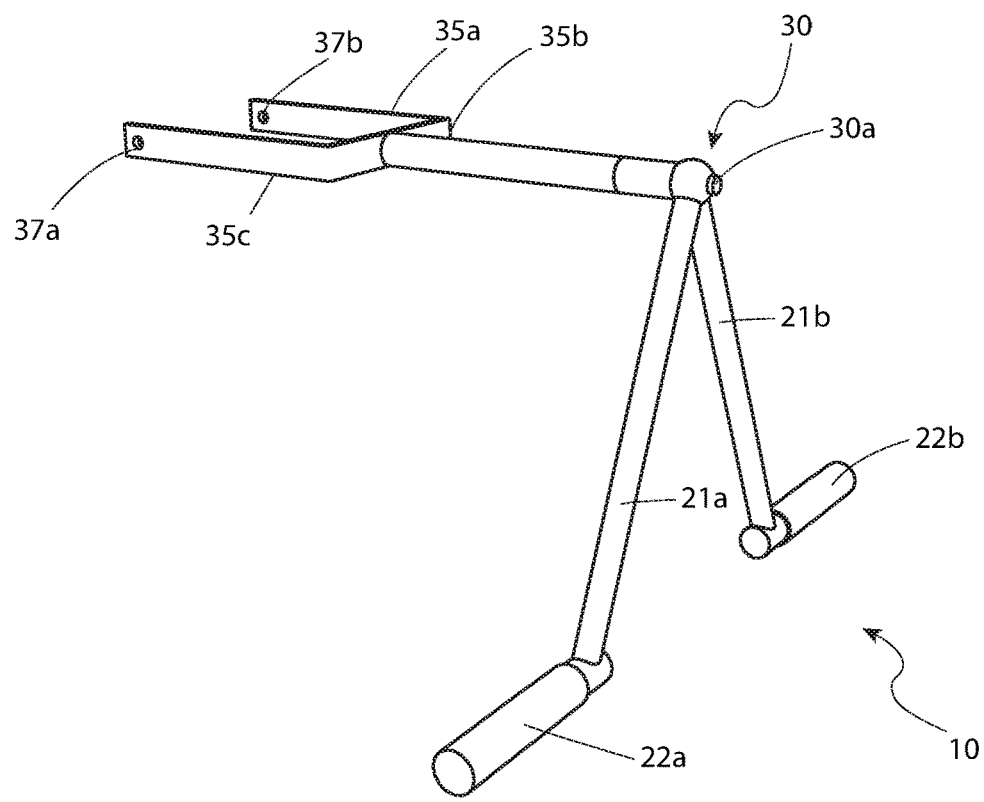
FIG. 3 is an alternate perspective view of the handlebar assembly 10, according to the preferred embodiment of the present invention.
Figure 4:
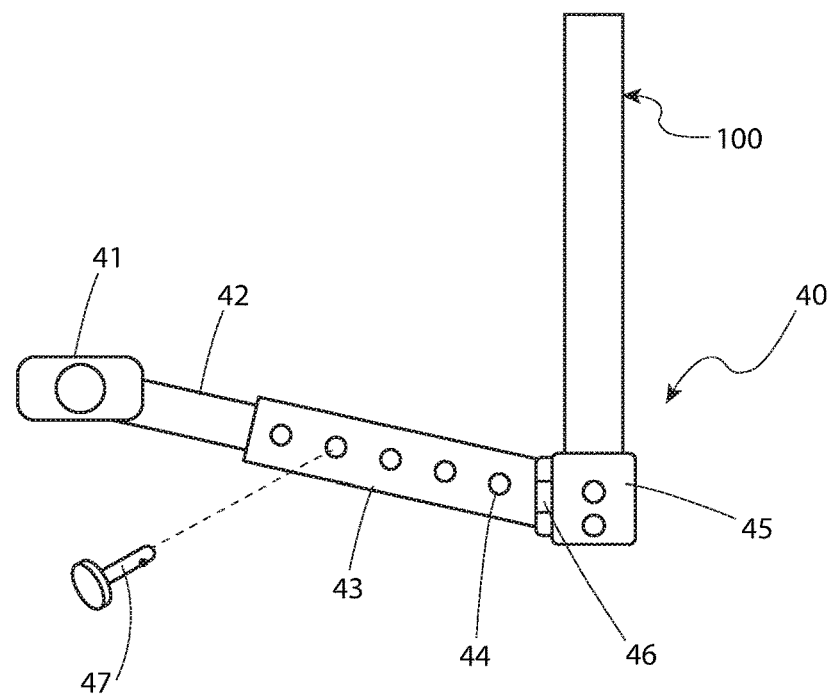
FIG. 4 is a side close-up view of the foot peg assembly 40 attached to a motorcycle 40, according to the preferred embodiment of the present invention.
Figure 5:
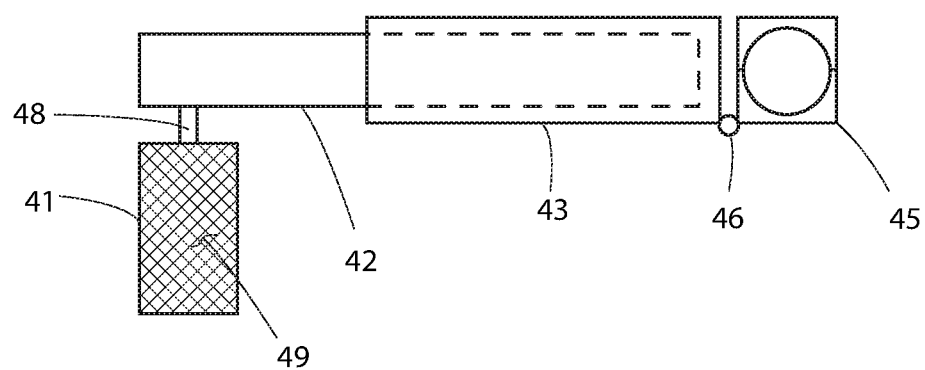
FIG. 5 is a top close-up view of the foot peg assembly 40, according to the preferred embodiment of the present invention; and, FIG. 6 is a perspective view of a handlebar assembly 20, separated at a quick-connect fastener stem 30b and quick-connect fastener receiver 30c.
Figure 6:
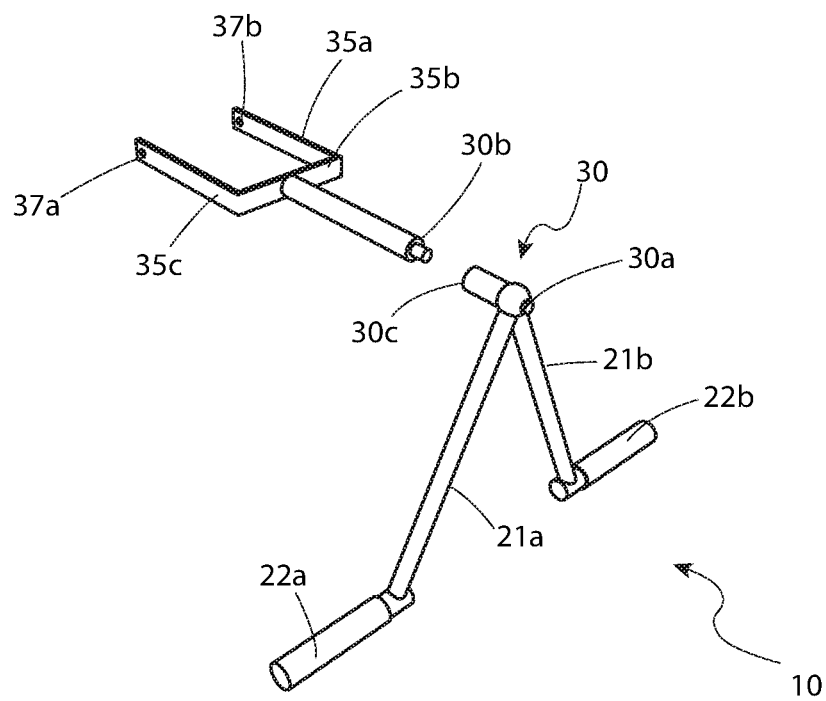

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under the scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention is directed to a rider safety system 10. In embodiments of the present invention, a rider safety system 10 may comprise a handlebar assembly 20 and a pair of foot peg assemblies 40, each capable of removable attachment to a motorcycle 100.

Referring now to the drawings, there is shown in FIGS. 1-6 is a rider safety system 10 for providing a motorcycle operator the ability to carry a passenger in front of him or her and use handlebars 21a, 21b and foot pegs 41 for safety. The handlebar assembly 20 and the foot peg assembly 40 are structured and arranged to be removably coupled to a motorcycle 100 to allow a user to sit as a passenger in front of a motorcycle operator.

Embodiments of the handlebar assembly 20 of the removable motorcycle passenger system may comprise a handlebar mount first side 35a, a handlebar mount second side 35b, a handlebar mount third side 35c, a quick-connect fastener assembly 30, and a pair of handlebars 21a, 21b. The handlebar mount first side 35a, handlebar mount second side 35b, and handlebar mount third side 35c are fashioned as a pair of forks, having a first handlebar mount aperture 37a located at a distal end of the handlebar mount first side 35a and a second handlebar mount aperture 37b located at a distal end of the handlebar mount third side 35c. The first handlebar mount aperture 37a and second handlebar mount aperture 37b are capable of receiving fasteners to mount the handlebar mount first side 35a, handlebar mount second side 35b, and handlebar mount third side 35c to a motorcycle 100. The handlebar mount first side 35a, handlebar mount second side 35b, and handlebar mount third side 35c may be removably coupled to the motorcycle 100, and may be removably coupled by fasteners (e.g., screws, nuts and bolts, clamps, biaser, clips, etc.) onto, into, or near the gas tank mounting location of the motorcycle 100. A post 32 extends away for the forks and terminates with a quick-connect fastener assembly 30. The handlebars 21a, 21b may be interchangeable via the quick-connect fastener assembly 30, such that the handlebars 21a, 21b may be of any style or color desired (e.g., "ape hangers", "pony tails", "drag bars", variable colors, different textures, etc.). The handlebars 21a, 21b are separable from the post 32 when the quick-connect fastener switch 30a is engaged. The handlebar assembly 20 may further comprise grips 22a, 22b mounted upon each of the handlebars 21a, 21b, whereupon each of the grips 22a, 22b may be removably coupled from each of the handlebars 21a, 21b. The handlebars 21a, 21b of different rider safety systems 10 may be removable, replaceable, and interchangeable via the quick-connect fastener assembly 30.

The quick-connect fastener assembly 30 of the handlebar assembly 20 allows the user to quickly and easily remove the pair of handlebars 21a, 21b without the use of tools. The use of the quick-connect fastener assembly 30 may include a single push-button 30a for ease of use. When actuated, the quick-connect fastener assembly switch or push-button 30a disengages a quick-connect fastener stem 30b, located at the post 32 second end, from a quick-connect receiver 30c, located at a handle bar assembly 20 first end. The handlebars 21a, 21b provide the user with a location to hold on to the motorcycle 100 for safety and security.

The foot peg assembly 40 of the rider safety system 10 may comprise a foot peg 41, an extension arm 42, a fixed arm 43, an adjustable-pin-lock 47, a foot peg swivel connector 48 and a foot peg mount 45. The foot peg 41 provides the user with a secure location to rest his or her feet to prevent the feet from dragging on the ground or having the user be burned by contact with a hot exhaust pipe of the motorcycle 100. The foot peg 41 may additionally include a textured or rubberized surface or surfaces 49 for increased traction. The foot peg 41 is affixed to a distal end of a first side of the extension arm 42 by a foot peg swivel connector 48 which permits the foot peg 41 to rotate about the axis of the foot peg swivel connector 48. The extension arm 42 having a plurality of apertures 44 freely slides in and out of the fixed arm 43 likewise having a plurality of apertures in an identical position to that of the extension arm 42. The adjustable-pin-lock 47 allows the user to adjust the distance at which the user's feet are located from the motorcycle by removing and replacing the pin-lock 47 in a desired and aligned foot peg assembly aperture 44 of the extension arm 42 and fixed arm 43. The foot peg mount 45 is preferably a clamping device capable of attaching the foot peg assembly 40 to be removably coupled to the motorcycle 100. A hinge 46, is secured between a first side of the fixed arm 43 and a first side of the foot peg mount 45 of each foot peg assembly 40. The hinge 46 permits a user to adjust the spread and width of a given foot peg assembly 40 away from a centerline of the motorcycle.

The exact specifications, materials used, and method of use of the removable motorcycle passenger system may vary upon manufacturing.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A rider safety system, comprising:
   a handlebar assembly, comprising:
      a handlebar mount comprising:
         a handlebar mount first side;
         a handlebar mount second side; and,
         a handlebar mount third side;
      a post secured at a post first end to said handlebar mount second side extending away from said handlebar mount second side;
      a quick-connect fastener assembly secured to said post at a post second end opposite said handlebar mount second side;
      a first handlebar having a first handlebar first end and a first handlebar second end; and,
      a second handlebar having a second handlebar first end and a second handlebar second end;
      wherein said first handlebar first end and said second handlebar first end are secured to said quick-connect fastener assembly;
   at least one foot peg assembly, comprising:
      a foot peg mount;
      a fixed arm, having a fixed arm first end secured to said foot peg mount;
      an extendable arm, having an extendable arm first end slidably engaging a fixed arm second end; and,
      a foot peg affixed to an extendable arm second end;
   wherein said handlebar mount is configured to be secured to a motorcycle frame; and,
   wherein said foot peg mount is configured to be secured to said motorcycle frame.

2. The system of claim 1, wherein said handlebar mount comprises:
   a first handlebar mount aperture disposed within said handlebar mount first side opposite said quick connect fitting; and,
   a second handlebar mount aperture disposed within said handlebar mount third side opposite said quick connect fitting;
   wherein said first handlebar mount aperture and said second handlebar mount aperture are each capable of receiving a fastener to removably secure said handlebar assembly to said motorcycle frame.

3. The system of claim 2, wherein said first handlebar comprises a first grip removably secured to said first handlebar second end.

4. The system of claim 3, wherein said second handlebar comprises a second grip removably secured to said second handlebar second end.

5. The system of claim 1, wherein said quick connect fitting further comprises a switch, wherein activation of said switch releases said handle bar assembly from said post.

6. The system of claim 1, wherein said first handlebar and said second handlebar are secured at an equal and opposite angle to said quick connect fitting.

7. The system of claim 1, wherein said fixed arm comprises a plurality of apertures configured to receive an adjustable pin-lock thereby securing said extendable arm within said fixed arm at a desired position.

8. The system of claim 1, wherein said foot peg comprises a textured surface.

9. The system of claim 1, wherein said foot peg mount is hingedly secured to said fixed arm.

10. A rider safety system, comprising:
    a motorcycle;
    a handlebar assembly, comprising:
       a handlebar mount comprising:
          a handlebar mount first side;
          a handlebar mount second side; and,
          a handlebar mount third side;
       a post secured at a post first end to said handlebar mount second side extending away from said handlebar mount second side;
       a quick-connect fastener assembly secured to said post at a post second end opposite said handlebar mount second side;
       a first handlebar having a first handlebar first end and a first handlebar second end; and,
       a second handlebar having a second handlebar first end and a second handlebar second end;
       wherein said first handlebar first end and said second handlebar first end are secured to said quick-connect fastener assembly;
    at least one foot peg assembly, comprising:
       a foot peg mount;
       a fixed arm, having a fixed arm first end secured to said foot peg mount,
       an extendable arm, having an extendable arm first end slidably engaging a fixed arm second end; and,
       a foot peg affixed to an extendable arm second end;
    wherein said handlebar mount is configured to be secured to a motorcycle frame of said motorcycle; and,
    wherein said foot peg mount is configured to be secured to said motorcycle frame.

11. The system of claim 10, wherein said handlebar mount comprises:
    a first handlebar mount aperture disposed within said handlebar mount first side opposite said quick connect fitting; and,
    a second handlebar mount aperture disposed within said handlebar mount third side opposite said quick connect fitting;
    wherein said first handlebar mount aperture and said second handlebar mount aperture are each capable of receiving a fastener to removably secure said handlebar assembly to said frame.

12. The system of claim 11, wherein said first handlebar comprises a first grip removably secured to said first handlebar second end.

13. The system of claim 12, wherein said second handlebar comprises a second grip removably secured to said second handlebar second end.

14. The system of claim 10, wherein said quick connect fitting further comprises a switch, wherein activation of said switch releases said handle bar assembly from said post.

15. The system of claim 10, wherein said first handlebar and said second handlebar are secured at an equal and opposite angle to said quick connect fitting.

16. The system of claim 10, wherein said fixed arm comprises a plurality of apertures configured to receive an adjustable pin-lock thereby securing said extendable arm within said fixed arm at a desired position.

17. The system of claim 10, wherein said foot peg comprises a textured surface.

18. The system of claim 10, wherein said foot peg mount is hingedly secured to said fixed arm.

\* \* \* \* \*